United States Patent
Tsutsumi

(10) Patent No.: US 12,528,367 B2
(45) Date of Patent: Jan. 20, 2026

(54) CHARGING CONTROL SYSTEM, CHARGING CONTROL METHOD AND AIRCRAFT

(71) Applicant: HONDA MOTOR CO., LTD., Tokyo (JP)

(72) Inventor: Daiko Tsutsumi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 385 days.

(21) Appl. No.: 18/185,378

(22) Filed: Mar. 17, 2023

(65) Prior Publication Data
US 2023/0311676 A1    Oct. 5, 2023

(30) Foreign Application Priority Data
Mar. 30, 2022   (JP) ................................ 2022-055032

(51) Int. Cl.
| | |
|---|---|
| *B60L 50/61* | (2019.01) |
| *B60W 10/26* | (2006.01) |
| *B60W 20/13* | (2016.01) |
| *B64D 31/02* | (2006.01) |

(52) U.S. Cl.
CPC .............. *B60L 50/61* (2019.02); *B60W 10/26* (2013.01); *B60W 20/13* (2016.01); *B64D 31/02* (2013.01); *B60L 2200/10* (2013.01); *B64D 2221/00* (2013.01)

(58) Field of Classification Search
None
See application file for complete search history.

(56) References Cited

U.S. PATENT DOCUMENTS

| | | | |
|---|---|---|---|
| 2012/0139481 A1* | 6/2012 | Tani | H02J 7/0031 320/107 |
| 2016/0023773 A1 | 1/2016 | Himmelmann | |
| 2016/0236790 A1* | 8/2016 | Knapp | B64D 27/24 |
| 2020/0393259 A1* | 12/2020 | Gantt, Jr. | B60L 53/65 |
| 2022/0042465 A1* | 2/2022 | Swann | B64D 27/357 |

FOREIGN PATENT DOCUMENTS

| | | |
|---|---|---|
| JP | 2012125027 A | 6/2012 |
| JP | 2019038327 A | 3/2019 |
| JP | 2019077361 A | 5/2019 |

OTHER PUBLICATIONS

Office Action issued for counterpart Japanese Application No. 2022-055032, transmitted from the Japanese Patent Office on Oct. 7, 2025 (drafted on Sep. 26, 2025).

* cited by examiner

*Primary Examiner* — Navid Z. Mehdizadeh
*Assistant Examiner* — Jason R Roberson

(57) ABSTRACT

A charging control system (70) includes a power unit having a power generation apparatus (40a) configured to perform power generation to supply electric power to a load, and a battery (32) configured to accumulate the electric power supplied from the power generation apparatus and supply the electric power that is accumulated to the load, and a control section (91) configured to apply a target power feed amount indicating an amount of power to be supplied to the load and a target power charge amount indicating an amount of power to be stored in the battery to a charge loss characteristic of the battery and a fuel consumption characteristic of the power generation apparatus to decide a fuel consumption of the power generation apparatus and to control charge of the battery based on the fuel consumption. In accordance with this, the fuel consumption can be suppressed.

20 Claims, 11 Drawing Sheets

CHARGING CONTROL SYSTEM, CHARGING CONTROL METHOD AND AIRCRAFT

CROSS-REFERENCE TO RELATED APPLICATIONS

The contents of the following Japanese patent application(s) are incorporated herein by reference:
NO. 2022-055032 filed in JP on Mar. 30, 2022

BACKGROUND

1. Technical Field

The present invention relates to a charging control system, a charging control method, and an aircraft.

2. Related Art

Up to now, a vertical take-off and landing aircraft (which is referred to as a VTOL aircraft or also simply referred to as an aircraft) has been proposed which is configured to take off and land by going up and down in a vertical direction by a plurality of take-off and landing (VTOL) rotors arranged on left and right of a fuselage, and to fly in a horizontal direction by cruising rotors arranged in a rear section of the fuselage. Such an aircraft operates a plurality of rotors by using electric power generated by using a power generation apparatus including a gas turbine engine or electric power stored in a battery. Here, in an aircraft described in Patent Document 1, a gas turbine engine is driven at a high output so as to improve a fuel consumption efficiency. Furthermore, the gas turbine engine is switched between an operating state and a suspended state based on an amount of power accumulated in the battery during flight. Electric power is generated by a power generation apparatus during the operating state to operate the rotors and also charge the battery to be fully charged, and the battery is discharged during the suspended state to operate the rotors with the electric power from the discharge alone. Patent Document 1: Japanese Patent Application Publication No. 2019-77361

DESCRIPTION OF EXEMPLARY EMBODIMENTS

Hereinafter, the present invention will be described by way of embodiments of the invention, but the following embodiments do not limit the invention according to the claims. In addition, not all of the combinations of features described in the embodiments are essential for a solving means of the invention.

Figure 1:
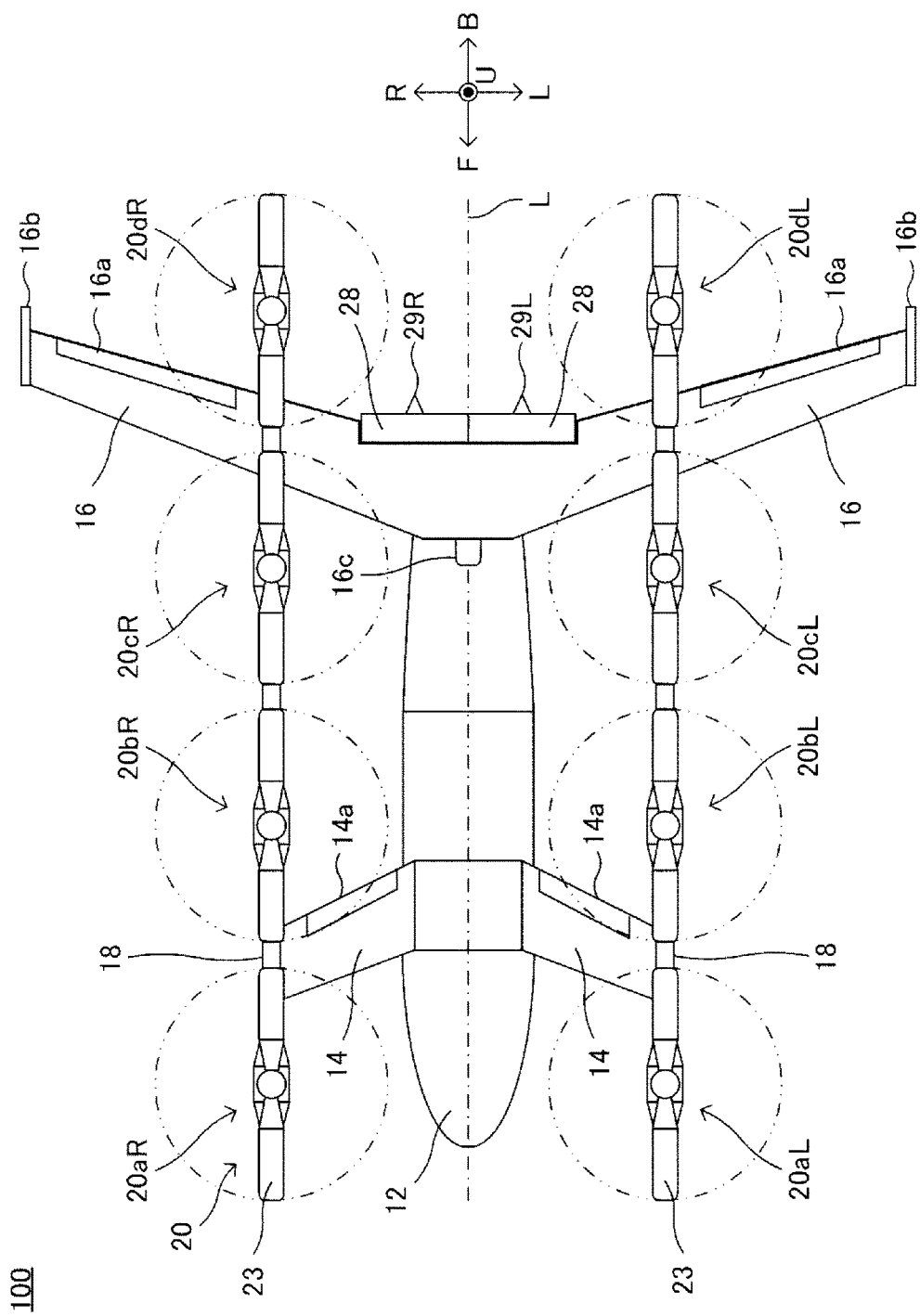
FIG. 1 illustrates a configuration of an aircraft according to the present embodiment in a top view.

FIG. 1 illustrates a configuration of an aircraft 100 according to the present embodiment in a top view. The aircraft 100 is a vertical take-off and landing aircraft which includes a plurality of rotors having electric motors as a drive source and which is configured to take off and land in a vertical direction by generating a thrust by using take-off and landing rotors (also referred to as VTOL rotors) 20 and to fly in a horizontal direction by generating a thrust by using cruising rotors (also referred to as cruise rotors) 29, and is also a hybrid aircraft configured to operate the electric motors by using electric power generated by a power generation apparatus 40*a* (an engine 44 and a motor generator 42) and electric power stored in a battery 32 and can also charge the battery 32 by the power generation apparatus 40*a*.

The aircraft 100 according to the present embodiment is configured to control charge of the battery 32 by the power generation apparatus 40*a* during flight, and includes a fuselage 12, a front wing 14, a rear wing 16, two booms 18, the eight VTOL rotors 20, the two cruising rotors 29, a high voltage system 40, a communication system 49, and a charging control system 70.

The fuselage 12 is a structure providing a space for an occupant or a passenger to board and for goods or the like to be loaded, and storing apparatuses such as the battery 32, the motor generator 42, and the engine 44. The fuselage 12 is bilaterally symmetric relative to a central axis L, and has a shape that extends in a front-back direction that is parallel to the central axis L and is thin in a left-right direction that is orthogonal to the central axis L in a horizontal plane. Herein, the direction parallel to the central axis L is defined as the front-back direction, in which the left side of the drawing and the right side of the drawing are respectively front (F) and back (B), and the direction orthogonal to the central axis L in the horizontal plane is defined as the width direction (or the left-right direction), in which an upper side of the drawing and a lower side of the drawing are respectively right (R) and left (L). In addition, the vertical direction is orthogonal to each of the front-back direction and the width direction, in which upward and downward in the vertical direction are also respectively referred to as upper (U) and lower (L). The fuselage 12 has a front end with a round curvature in a top view, and a rear end parallel to the width direction which is tapered to some extent relative to a barrel portion.

The front wing 14 is a wing body provided to extend laterally from the fuselage 12, and configured to generate a lift during cruise, that is, by moving forward, which functions as a canard of the aircraft 100. The front wing 14 has a V-shape with two wing bodies respectively extending from a center portion in the front-left direction and the front-right direction, and is fixed on an upper portion of the front side of the barrel portion of the fuselage 12 at the center portion with the opening of the V-shape facing towards the front. The front wing 14 includes elevators 14a arranged in respective rear edges of the two wing bodies.

The rear wing 16 is a wing body provided to extend laterally from the fuselage 12, and configured to generate a lift during cruise, that is, by moving forward, which functions as a swept-back wing configured to reduce air resistance. The rear wing 16 has a V-shape with two wing bodies respectively extending from the center portion in the back-left direction and the back-right direction, and is fixed via a pylon 16c on the upper portion of the rear end of the barrel portion of the fuselage 12 at the center portion with the opening of the V-shape facing towards the back. The rear wing 16 includes elevons 16a arranged in respective rear edges of the two wing bodies and vertical stabilizers 16b arranged at wing ends.

Herein, the wing area of the rear wing 16 is greater than that of the front wing 14, and the wing width of the rear wing 16 is wider than that of the front wing. In this manner, the lift generated by the rear wing 16 by moving forward is greater than the lift generated by the front wing 14, and the rear wing 16 functions as the main wing of the aircraft 100. Note that, the wing areas, the lengths, or the like of the front wing 14 and the rear wing 16 may be defined based on the balance of the lift generated by each wing, the center of gravity, the attitude of the aircraft body during cruise, and the like.

The two booms 18 are structures laterally spaced from each other from the fuselage 12 and supported by the front wing 14 and the rear wing 16, and function to support or store respective components of the VTOL rotors 20. The two booms 18 each have a cylindrical shape extending in the front-back direction in a top view and a wing-shaped cross section with the upper side having a round curvature and the lower side tapered in a front view, and are paired to be arranged bilaterally symmetrically with respect to the fuselage 12 (that is, the central axis L). Note that the two booms 18 may be formed to extend in the front-back direction and have an arch-shape curvature in the width direction. The two booms 18 each have a front end portion located on the forward side relative to the front wing 14 and are supported to the tip of the front wing 14 by a front side of the barrel portion (between the two VTOL rotors 20aL and 20bL on the front side and between the two VTOL rotors 20aR and 20bR on the front side), and also each have a rear end portion located on the back side relative to the rear wing 16 and are supported to the rear wing 16 by a back side of the barrel portion (between the two VTOL rotors 20cL and 20dL on the back side and between the two VTOL rotors 20cR and 20dR on the back side).

The eight VTOL rotors 20 (20aL to 20dL and 20aR to 20dR) are an example of a load to be supplied with electric power generated by the power generation apparatus 40a, and are a propulsion system supported by the two booms 18 and configured to generate a thrust to fly during take-off and landing, that is, thrust in the vertical direction. The four VTOL rotors 20aL to 20dL among the eight VTOL rotors 20 are supported to the boom 18 on the left side at substantially equal intervals, and the remaining four VTOL rotors 20aR to 20dR are supported to the boom 18 on the right side at substantially equal intervals. Herein, with regard to the VTOL rotors 20aL to 20dL on the left side, the VTOL rotor 20aL is arranged at a forwardmost position, the two VTOL rotors 20bL and 20cL are respectively arranged in the front and the back between the front wing 14 and the rear wing 16, and the VTOL rotor 20dL is arranged at a rearmost position. Similarly, with regard to the VTOL rotors 20aR to 20dR on the right side, the VTOL rotor 20aR is arranged at a forwardmost position, the two VTOL rotors 20bR and 20cR are respectively arranged in the front and the back between the front wing 14 and the rear wing 16, and the VTOL rotor 20dR is arranged at a rearmost position. Among these VTOL rotors 20aL to 20dL on the left side and these four VTOL rotors 20aR to 20dR on the right side, two each of the VTOL rotors 20aL and 20aR, the VTOL rotors 20bL and 20bR, the VTOL rotors 20cL and 20cR, and the VTOL rotors 20dL and 20dR on the left and right sides which are equally positioned with respect to the front-back direction respectively form pairs, and are controlled to rotate in mutually opposite directions.

Note that unless otherwise specified, each of the eight VTOL rotors 20aL to 20dL and 20aR to 20dR is simply referred to as a VTOL rotor 20.

Figure 2:
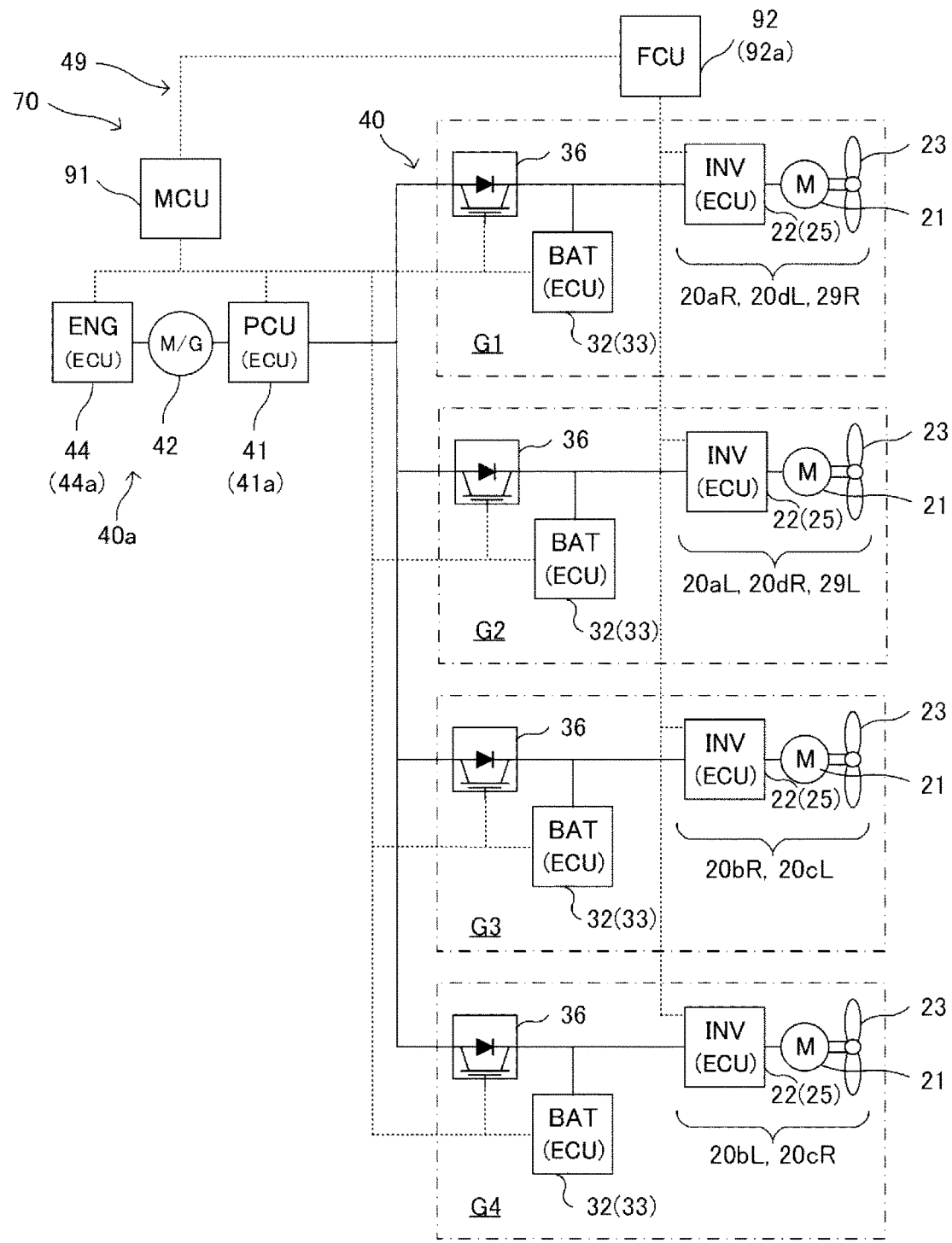
FIG. 2 illustrates a configuration of a high voltage system and a configuration of a communication system.

The VTOL rotor 20 has one or more blades 23, a motor 21, an inverter 22, and an ECU 25 (see FIG. 2).

The one or more blades 23 are a blade like member supported on the boom 18 and configured to generate a thrust in the vertical direction by rotating. In the present embodiment, the number of blades 23 is set as 2, but may be 1 or any number including 3 or more. The one or more blades 23 are supported at a position higher than the front wing 14 and the rear wing 16. Note that in FIG. 1, the plane of rotation of the one or more blades 23 of each VTOL rotor 20 is illustrated by using two-dotted lines.

The motor 21 is an electric motor which has a rotary shaft (not illustrated) facing in the up-and-down direction and which is configured to rotate the blade 23 fixed to the motor 21 via a transmission (not illustrated) configured to convert a rotation speed of the rotary shaft. The motor 21 is housed in the boom 18.

The inverter 22 is an apparatus configured to receive the supply of DC power via the high voltage system 40 from the battery 32 and convert the DC power into AC power to be supplied to the motor 21 by driving (turning on and off) a switching element according to a drive signal received from the ECU 25. The inverter 22 is housed in the boom 18 together with the motor 21. The inverter 22 can control the rotational torque and the rotation speed of the motor 21 by increasing and decreasing an amplitude and a frequency of the AC power, respectively.

The electronic control unit (ECU) 25 is a unit configured to control, by transmitting the drive signal to the inverter 22, the operation to modulate the amplitude and the frequency of the AC power, and also to manage a state of power input to the inverter 22. In the present embodiment, the ECU 25 is built in the inverter 22. As an example, the ECU 25 is implemented by a micro controller, operates by receiving DC power at a low voltage via a low voltage system (also referred to as LVS) from the battery 32, and exhibits a control function by performing a dedicated program stored in a memory. Herein, the state of power input to the inverter 22 includes at least a voltage (also referred to as an inter-terminal voltage) added to an input terminal of the inverter 22, a current entering an input end, and a product of those (that is, electric power). The ECU 25 detects the state of power input to the inverter 22 and transmits those detection results to a flight controller 92.

The two cruising rotors 29 (29L and 29R) are an example of the load to which the electric power generated by the power generation apparatus 40a is supplied, and are a propulsion system (see FIG. 2) supported to the rear end of the fuselage 12 and configured to generate a thrust to fly during cruise. The cruising rotors 29L and 29R are arranged side by side on the left and right relative to the central axis L in a cylindrical duct 28 fixed to the rear end of the fuselage 12, and have one or more blades 23 supported in the duct 28 and configured to generate a thrust to move forward by rotating, the motor 21 having the rotary shaft facing in the front-back direction and rotating the one or more blades 23 fixed to the tip via the rotary shaft, the inverter 22 configured to receive DC power supply from the battery 32 and convert the DC power into AC power to be supplied to the motor 21, and the ECU 25 configured to control the operation of the inverter 22. The inverter 22 can control the rate of rotation of the motor 21. These respective components are constituted similarly to those in the VTOL rotor 20.

Note that unless otherwise specified, each of the two cruising rotors 29L and 29R will be simply referred to as the cruising rotor 29. In addition, unless otherwise specified, the VTOL rotors 20 and the cruising rotors 29 will be collectively referred to as rotors 20 and 29.

FIG. 2 illustrates a configuration of the high voltage system (also referred to as a power distribution system (PDS) 40 and a configuration of the communication system 49.

The high voltage system 40 is an example of a power unit, and is constituted to include a pair of power generation apparatuses 40a and four group components G1 to G4. Note that these respective components are connected via a power line (power cable represented by a solid line).

The power generation apparatus 40a is a power source configured to perform power generation by using the engine 44 based on a target power generation amount to supply the generated electric power to the load, and is constituted to include the engine (ENG) 44, the motor generator (M/G) 42, and a power control unit (PCU) 41.

The engine 44 is an internal combustion engine such as a reciprocating engine and a gas turbine engine. The engine 44 is configured to generate rotational power to be output to the motor generator 42. The engine 44 is controlled by an ECU 44a built therein.

The ECU 44a is a unit configured to control power generation by operating the engine 44 based on a target power generation amount received from a control section 91. As an example, the ECU 44a is implemented by a micro controller, operates by receiving DC power at a low voltage via the low voltage system from the battery 32, and exhibits a control function by performing a dedicated program stored in the memory.

The motor generator 42 is an electric motor generator serving as a starter when the engine 44 is to be started and also as a generator after the start of the engine 44. A rotary shaft of the motor generator 42 is coupled to an output shaft of the engine 44. The motor generator 42 is configured to receive motive power of the engine 44 to perform power generation, that is, generate AC power (in particular, three-phase AC power) to be output to the PCU 41, and then supply the generated electric power via the PCU 41 to the load (that is, the VTOL rotors 20 and the cruising rotor 29 for generating a thrust to fly). In addition, at the time of the start of the engine 44, the motor generator 42 receives AC power to generate rotational power to be output to the engine 44.

The PCU 41 is an electric power conversion unit configured to convert AC power (in particular, three-phase AC power) input from a primary side by using an inverter circuit into DC power to be output to a secondary side, and also to convert DC power input from the secondary side into AC power (in particular, three-phase AC power) to be output to the primary side. A primary side terminal of the PCU 41 is connected to the motor generator 42, and a secondary side terminal is connected to each of the four group components G1 to G4. The PCU 41 can convert AC power output from the motor generator 42 into DC power to be output towards each of the four group components G1 to G4, and also convert DC power supplied from the batteries 32 included in the four group components G1 to G4 into AC power to be output to the motor generator 42. The PCU 41 is controlled by an ECU 41a built therein.

The ECU 41a is a unit configured to control power generation by operating the PCU 41 based on the target power generation amount received from the control section 91. As an example, the ECU 41a is implemented by a micro controller, operates by receiving DC power at a low voltage via the low voltage system from the battery 32, and exhibits a control function by performing a dedicated program stored in the memory.

Each of the four group components G1 to G4 is an electric component group assembled to include any two of the eight VTOL rotors 20, further any one of the two cruising rotors 29 for the group components G1 and G2, the battery 32 attached to these, and a switch 36. Note that these components including the battery 32 are connected via the power line (power cable represented by the solid line) and a circuit element such as a conductor or a diode.

The group component G1 includes the VTOL rotors 20aR and 20dL, the cruising rotor 29R, the battery 32, and the switch 36.

As described above, each of the VTOL rotors 20aR and 20dL and the cruising rotor 29R includes the motor 21 configured to rotate one or more blades 23, and the inverter 22 configured to receive the supply of DC power from the battery 32 and convert the DC power into AC power to be supplied to the motor 21. These three rotors 20 and 29 are connected to the battery 32 in parallel. Note that for simplicity in FIG. 2, the VTOL rotors 20aR and 20dL and the cruising rotor 29R are represented by a single rotor.

The battery 32 is an internal power source configured to accumulate electric power supplied from the power generation apparatus 40a and supply the accumulated electric power to the engine 44 to start, and to supply the accumulated electric power to the rotors 20 and 29 to operate. The battery 32 accumulates the electric power supplied from the power generation apparatus 40a and also supplies the accumulated electric power to the VTOL rotors 20 and the cruising rotor 29 (the motor 21 via the inverter 22). Herein, a state of charge (in particular, a remaining charge amount or a charge rate) of the battery 32 is also referred to as an SOC. The battery 32 is connected between the three rotors 20 and 29 described above and the switch 36. The battery 32 is managed by an ECU 33 built therein.

The ECU 33 is a unit configured to manage the state of charge (SOC) of the battery 32. As an example, the ECU 33 is implemented by a micro controller, operates by receiving DC power at a low voltage via the low voltage system from the battery 32, and exhibits a control function by performing a dedicated program stored in the memory. Herein, the state of charge of the battery 32 includes at least a charge amount (remaining charge amount which is also referred to as the SOC), a discharge amount (discharge power amount), and a temperature. The ECU 33 is configured to detect the state of charge of the battery 32 by any method, for example, by detecting currents output from the battery 32 to calculate an integration value thereof or detecting a potential at an output end. A result of the detection is transmitted to the control section 91 via a communication line.

The switch 36 is an element configured to connect and disconnect the group component G1 to and from the secondary side terminal of the PCU 41, and as an example, is constituted to include a rectifying element (diode) and a switching element which are connected in parallel. The rectifying element is an element through which only electric power heading into the group component G1 from the PCU 41 passes. The switching element is an element configured to short-circuit both ends of the rectifying element, and for example, an element such as an insulated gate bipolar transistor (IGBT) can be used as the switching element. By turning off the switch 36 (switching element), DC power output from the PCU 41 can be transmitted to the battery 32 and the three rotors 20 and 29 via the rectifying element, and by turning on the switch 36, DC power from the battery 32 can be transmitted to the PCU 41 via the switching element.

Note that since the switch 36 includes the rectifying element, during the operation of the VTOL rotors 20 and the cruising rotor 29, the supply of electric power from the battery 32 in a certain group component among the four group components G1 to G4 to the other group components can be avoided.

The group component G2 includes the VTOL rotors 20aL and 20dR, the cruising rotor 29L, the battery 32, and the switch 36. These respective components are constituted similarly to those in the group component G1. Note that for simplicity in FIG. 2, the VTOL rotors 20aL and 20dR and the cruising rotor 29L are represented by a single rotor.

The group component G3 includes the VTOL rotors 20bR and 20cL, the battery 32, and the switch 36. These respective components are constituted similarly to those in the group component G1. For simplicity in FIG. 2, the VTOL rotors 20bR and 20cL are represented by a single rotor.

The group component G4 includes the VTOL rotors 20bL and 20cR, the battery 32, and the switch 36. These respective components are constituted similarly to those in the group component G1. For simplicity in FIG. 2, the VTOL rotors 20bL and 20cR are represented by a single rotor.

Note that in the aircraft 100 according to the present embodiment, the single battery 32 is included in each of the four group components G1 to G4, and the four batteries are included in total. However the configuration is not limited to this, and any number of batteries 32 may be included. For example, the single battery 32 is included in two of the four group components G1 to G4, and the two batteries 32 are included in total, or two each of the batteries 32 are included in each of the group components G1 to G4, and the eight batteries 32 are included in total. The number of group components is not limited to three rotors each to be assembled into a component, and a component may be assembled with two rotors each or four rotors each. On that basis, one or more batteries 32 may be included in each group component.

The communication system 49 includes the flight controller (FCU) 92, the control section (MCU) 91, the ECU 44a built in the engine 44, the ECU 41a built in the PCU 41, the four switches 36 included in the group components G1 to G4, the four ECUs 33 each of which is connected to the battery 32, and the ten ECUs 25 each of which is connected to the inverter 22. These are connected via a communication line (communication cable represented by a dotted line) so as to be mutually communicable.

The charging control system 70 is a system configured to control charge of the battery 32 by the power generation apparatus 40a, and constituted to include the flight controller 92, the control section 91, and the four ECUs 33 among control units included in the communication system 49.

The flight controller 92 is an example of a decision unit, and is a unit configured to receive an operation signal from an occupant of the aircraft 100 via an interface 92a such as a control stick or a thrust lever to control operations of respective components. The flight controller 92 is connected to each of the control section 91 and the ten ECUs 25 via the communication line. As an example, the flight controller 92 is implemented by a micro controller, operates by receiving DC power at a low voltage via the low voltage system from the battery 32, and exhibits a control function by performing a dedicated program stored in the memory.

For example, when a command related to steering of the aircraft 100, a command of take-off or cruise, or the like is received via the interface 92a, the flight controller 92 is configured to detect states (a rotation speed of the blade 23, an inter-terminal voltage of the inverters 22, and the like) of the VTOL rotors 20 and the cruising rotor 29 (that is, the load) from the ECU 25, and decide an individually required thrust (also referred to as a thrust command value) based on these states and an amount of power (that is, a target power feed amount) required to generate the individual thrust to be transmitted to the ECUs 41 and 44 via the control section 91, so that the power generation apparatus 40a is caused to generate electric power required for the rotors 20 and 29 to operate. Together with this, the flight controller 92 is configured to cause the switching element of the inverter 22 to operate by transmitting the thrust command value (or the rotation speed of the rotors 20 and 29 required to generate the thrust) to the ECU 25, and convert DC power output from the PCU 41 or DC power supplied from the battery 32 into AC power to be output to the motor 21. As a result, the motor 21 is activated, and the blade 23 rotates, so that the commanded thrust for the VTOL rotors 20 and the cruising rotor 29 can be generated.

The control section (MCU) 91 is a unit configured to control the control units (that is, the ECUs) included in the communication system 49 in an overall manner, and for example, communicates with the switch 36 to control the operation of the switching element and transmits the target power generation amount to the ECUs 44a and 41a to control power generation by the engine 44 and the PCU 41, that is, the power generation apparatus 40a, and also communicates the ECU 33 to detect a state (in particular, a state of charge) of the battery 32. The control section 91 is connected to each of the engine 44 (the ECU 44a), the PCU 41 (the ECU 41a), the four switches 36, and the four ECUs 33 via the communication line. As an example, the control section 91 is implemented by a micro controller, operates by receiving DC power at a low voltage via the low voltage system from the battery 32, and exhibits a control function by performing a dedicated program stored in the memory.

In particular, the control section 91 in the charging control system 70 applies the target power feed amount indicating the amount of power to be supplied to the plurality of rotors 20 and 29 and the target power charge amount indicating the amount of power to be stored in the battery 32 to a charge loss characteristic of the battery 32 and a fuel consumption characteristic of the power generation apparatus 40a to decide a fuel consumption of the power generation apparatus 40a and control charge of the battery 32 based on the decided fuel consumption. A processing flow thereof will be described below.

Figure 3:
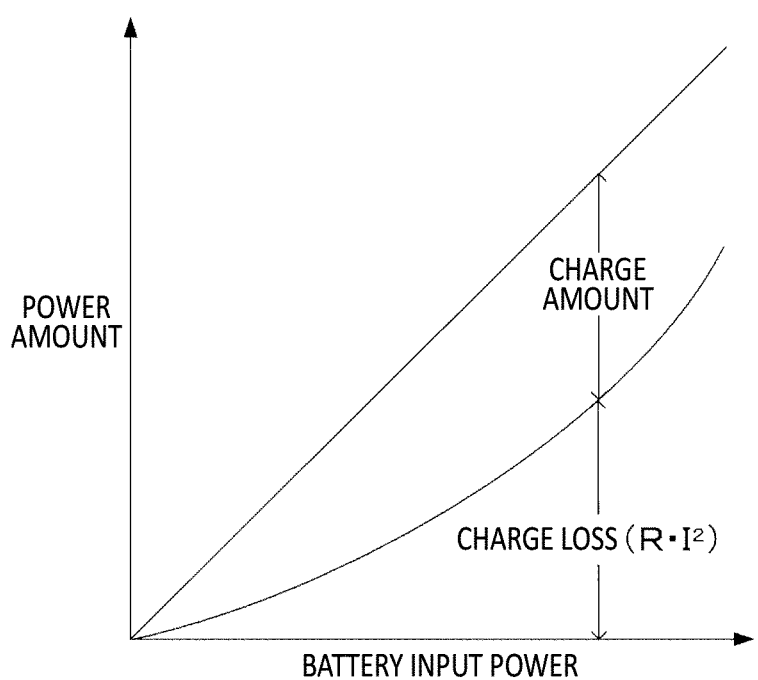
FIG. 3 illustrates a relationship (charge loss characteristic) between a charge amount and a charge loss with respect to input power to be input to a battery.

FIG. 3 illustrates a relationship (also referred to as a charge loss characteristic) between a charge amount and a charge loss with respect to input power to be input to the battery 32. In traditional charging control of the battery 32, power output of the power generation apparatus 40*a* has been increased to charge the battery 32 at a high speed to be fully charged. However, since the battery 32 has an internal resistance (R), when a current (I) flowing into the battery 32 increases, a charge loss (RI$^2$) occurs, and it is not possible for the battery 32 to accumulate all the input power. Note that since the current (I) flowing into the battery 32 is in proportion to the input power (VI by using an inter-terminal voltage V of the battery 32), the charge loss further increases as the input power increases. Therefore, in light of the charge loss of the battery 32, it is efficient to charge the battery 32 for a long period of time at small input power to such an extent that the charge loss decreases while the power output of the power generation apparatus 40*a* is suppressed.

Figure 4:
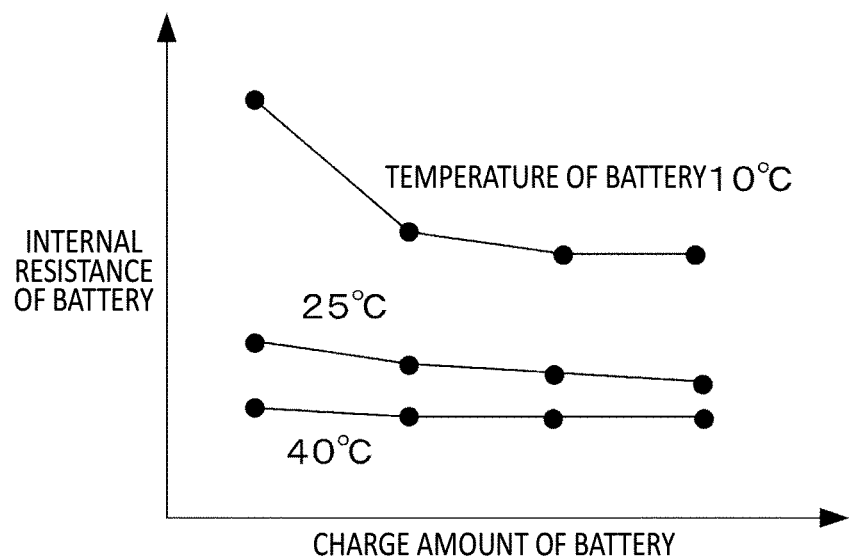
FIG. 4 illustrates a relationship between a charge amount (SOC) and a temperature of the battery, and an internal resistance of the battery.

FIG. 4 illustrates a relationship between a charge amount (SOC) and a temperature of the battery 32, and an internal resistance (R) of the battery 32. The internal resistance of the battery 32 depends on the charge amount, the temperature, or the like of the battery 32, and the internal resistance further decreases as the charge amount is larger and the temperature is higher in ranges of the charge amount and the temperature in a normal use state. The internal resistance R can be decided from FIG. 4 by detecting the charge amount and the temperature of the battery 32 by the ECU 33.

Note that the internal resistance (R) of the battery 32 also depends on deterioration of the battery 32, and has such a characteristic that the internal resistance further increases as the deterioration progresses. In view of the above, to take the deterioration of the battery 32 into account, the relationship illustrated in FIG. 4 between the charge amount (SOC) and the temperature of the battery 32 and the internal resistance (R) of the battery 32 may be measured at any timing before flight, for example, when the aircraft 100 is parking. Herein, time changes dV/dt and dI/dt of the inter-terminal voltage (V) and the input current (I) of the battery 32 with respect to temperatures of the plurality of batteries 32 are detected by the ECU 33, and the internal resistance (R) can be decided by R=dV/dI by using those detection results.

Figure 5:
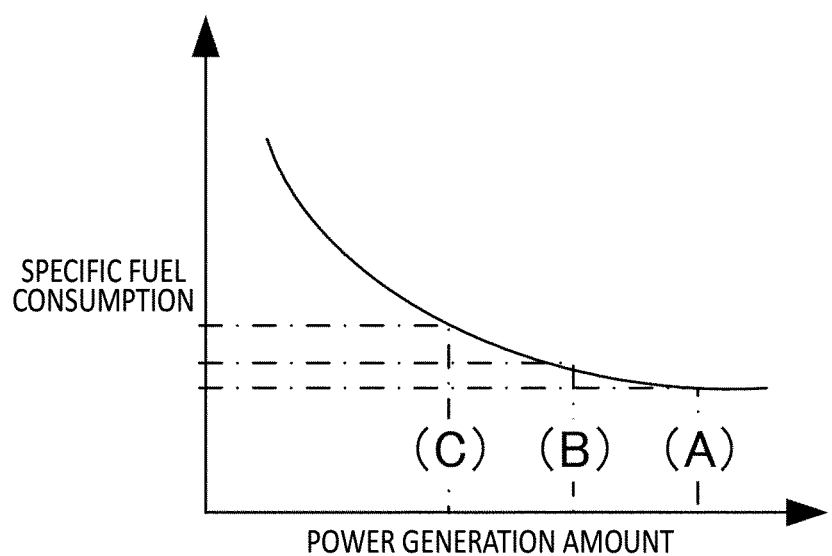
FIG. 5 illustrates a relationship (fuel consumption characteristic) between a power generation amount and a specific fuel consumption (SFC) of a power generation apparatus.

FIG. 5 illustrates a relationship (also referred to as a fuel consumption characteristic) between a power generation amount and a specific fuel consumption (SFC) of the power generation apparatus 40*a*. Note that the specific fuel consumption (kg/kWh) is an index representing an efficiency of a heat engine, and is given by a fuel consumption (kg) required to generate electric power of a unit power amount (kWh). In the case of the power generation apparatus 40*a* using the internal combustion engine such as the gas turbine engine, the specific fuel consumption is further improved as the power generation amount (kW) is larger. That is, when the same power amount (kWh) is to be generated, as the power generation amount (kW) is larger, the fuel consumption (kg) further decreases. That is, to generate the same power amount (kWh), as a power generation period (h) is shortened and the power generation amount (kW) is increased, the fuel consumption (kg) further decreases. Therefore, in light of the specific fuel consumption of the power generation apparatus 40*a*, it is efficient to charge the battery 32 by increasing the power output of the power generation apparatus 40*a*. It is noted however that also in light of the charge loss described above in combination, to feed power to the rotors 20 and 29 and operate those and also to feed power to the batteries 32 and charge those, it is expected that an optimal power generation amount of the power generation apparatus 40*a* exists.

Figure 6:
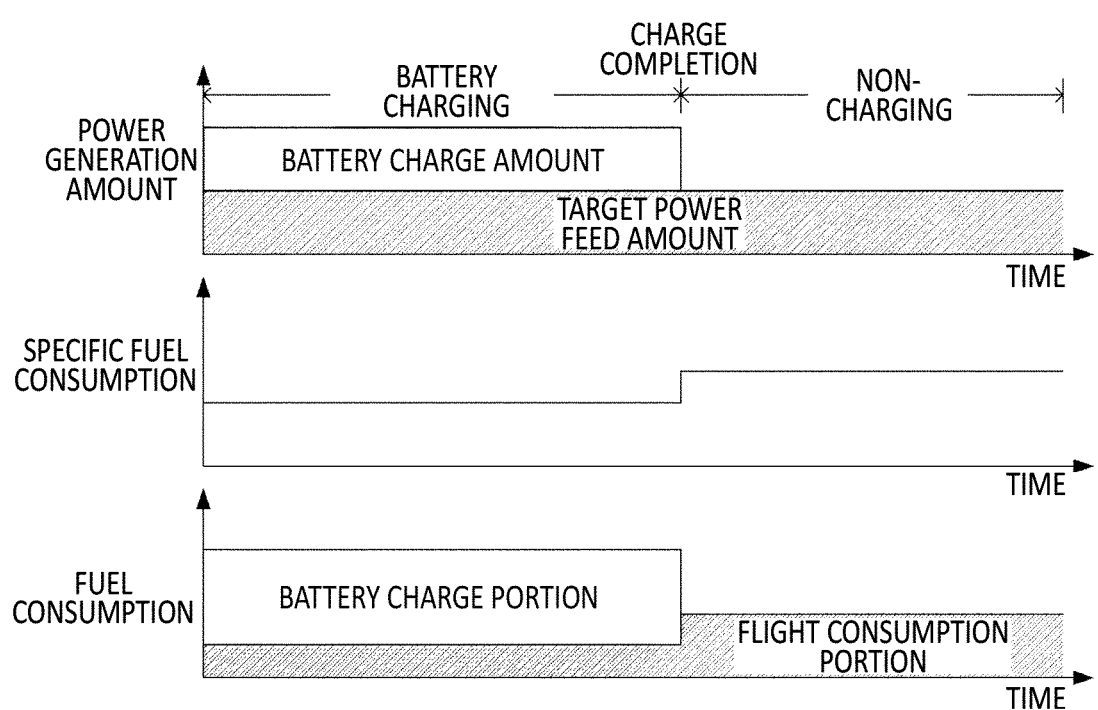
FIG. 6 illustrates a time transition example of the power generation amount, the specific fuel consumption (SFC), and a fuel consumption of the power generation apparatus.

FIG. 6 illustrates a time transition example of the power generation amount, the specific fuel consumption (SFC), and the fuel consumption of the power generation apparatus 40*a* in a top part, a middle part, and a bottom part, respectively. In the present example, it is assumed that power is fed to the rotors 20 and 29 from the power generation apparatus 40*a* to operate those for flight, and also power is fed to the batteries 32 to charge those until a certain time (referred to as a charge completion moment). Herein, it is assumed that the aircraft 100 is in a relatively stable flight state as in during cruise, for example, and the power amount (target power feed amount) for operating the rotors 20 and 29 to fly is fixed. In addition, it is assumed that the batteries 32 are to be charged at a fixed speed. As illustrated in the top part, during the charge of the batteries 32, the power generation amount by the power generation apparatus 40*a* is equal to a sum of charge amounts of the batteries 32 and a target power feed amount, and becomes equal to the target power feed amount after the charge completion.

Then, as illustrated in the middle part, the specific fuel consumption decreases (improves) during the charge of the batteries 32 since the power generation amount is large, and after the charge completion, the specific fuel consumption increases (deteriorates) since the power generation amount is small. Herein, it is not possible to appropriately change the power amount (that is, the target power feed amount) for flight to improve efficiency, and it is not possible to improve the specific fuel consumption after the charge completion. Therefore, by improving the specific fuel consumption by increasing the power generation amount by the power generation apparatus 40*a* during the charge of the batteries 32, the total fuel consumption of the power generation apparatus 40*a* can be improved.

With regard to the fuel consumption, as illustrated in the bottom part, during the charge of the batteries 32, the fuel consumption increases since the power generation amount of the power generation apparatus 40*a* is large, but the specific fuel consumption is low, so that a flight consumption portion (fuel consumed to generate electric power to operate the rotors 20 and 29 for flight) becomes lower than that after the charge completion. Therefore, it is found out that in light of the fuel consumption, it is efficient to charge the batteries 32 for a charging period at a power generation amount with such a size to an extent that a loss amount of fuel due to the charge loss of the batteries 32 does not become larger than a decrease amount of the flight consumption portion due to the improvement of the specific fuel consumption. Herein, when the charging period is long, the fuel consumption can be improved for a long period of time, but an extent of the improvement is small. When the charging period is short, the extent of the improvement of the fuel consumption is large, but a period of time during which the fuel consumption can be improved is short. Therefore, it is necessary to optimally decide the charging period such that the fuel consumption decreases.

Figure 7:
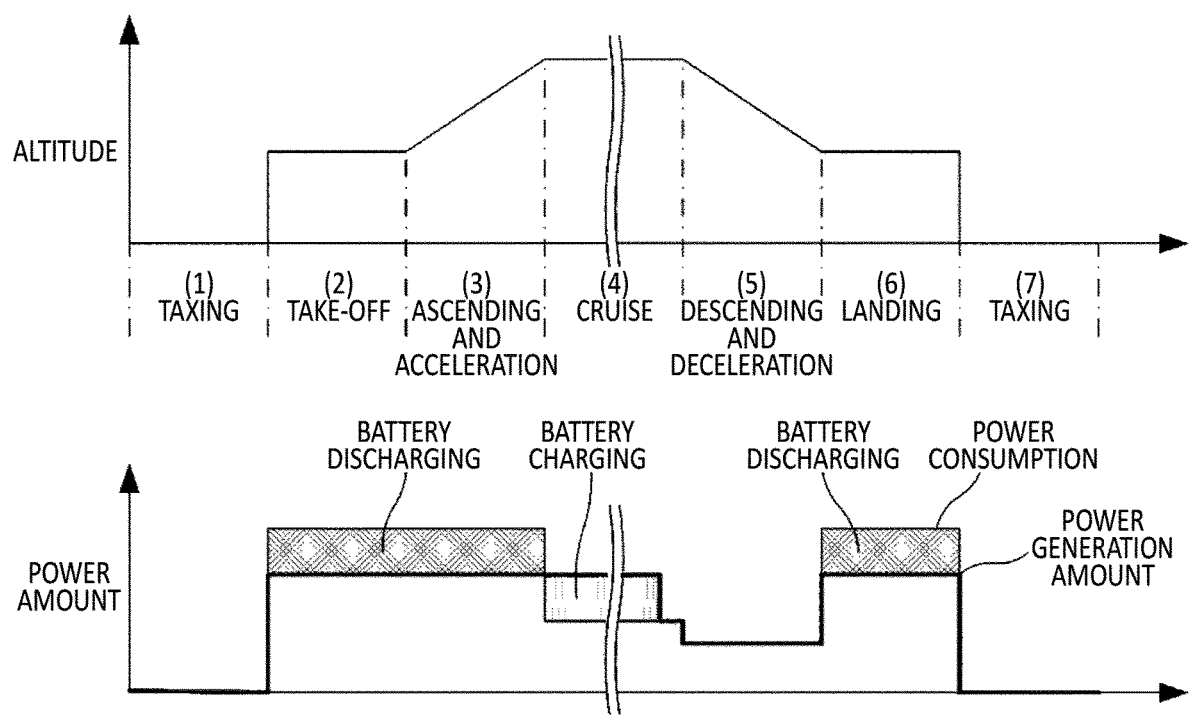
FIG. 7 illustrates a time transition example of a flight state of the aircraft and a power consumption by rotors, the power generation amount by the power generation apparatus, and a charge and discharge amount of the battery.

FIG. 7 illustrates a time transition example of a flight state of the aircraft 100 and a power consumption by the rotors 20 and 29, the power generation amount by the power generation apparatus 40*a*, and a charge and discharge amount of the battery 32 in a top part and a bottom part, respectively. As illustrated in the top part, for example, the aircraft 100 is configured to (1) travel on an airport taxiway using wheels to move to an airfield (so-called taxing), (2) operate the VTOL rotors 20 to take off, (3) further ascend and accelerate, (4) stop the VTOL rotors 20 and operate the cruising rotors 29 for cruise, and once the aircraft 100 arrives at a destination, (5) stop the cruising rotors 29 and operate the VTOL rotors 20 to descend and decelerate, (6) land on an airfield at the destination to stop the VTOL rotors 20, and (7) travel on a taxiway using wheels to evacuate from the airfield.

In the time transition of the flight states described above, as illustrated in the bottom part, the power consumption of the rotors 20 and 29 increases by operating the VTOL rotors 20 particularly during (2) take-off, (3) ascending and acceleration, and (6) landing. The power consumption by the VTOL rotors 20 at this time (that is, the target power feed amount during take-off and landing) is larger than the power generation amount that can be generated by the power generation apparatus 40a, and a shortage is made up by discharge power from the battery 32. Therefore, it is not appropriate to charge the battery 32 in these flight states. On the other hand, during (4) cruise, the aircraft 100 reaches a sufficiently high altitude to stop the VTOL rotors 20, and operates the cruising rotors 29 to fly in the horizontal direction. Note that during (5) descending and deceleration, the thrust by the cruising rotors 29 is further decreased, and flight is carried out using a lift by the front wing 14 and the rear wing 16. During cruise in comparison with a take-off and landing moment, the power consumption (that is, the target power feed amount during cruise) by the cruising rotors 29 is low, and in addition, a fluctuation of the power consumption is generally small, and a period of time in the cruise state is also long, so that it is suitable to stably charge the battery 32 during cruise. In view of the above, the charging control system 70 according to the present embodiment is configured to charge the battery 32 during cruise.

Figure 8:
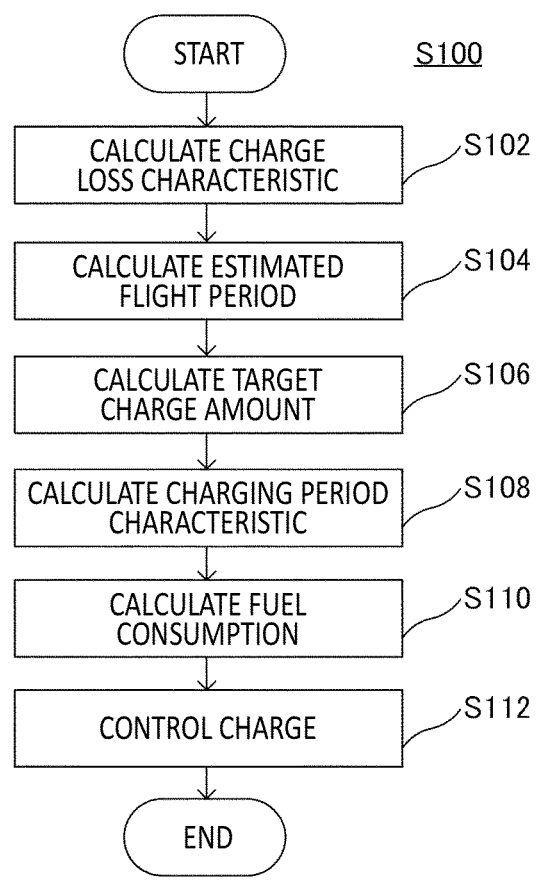
FIG. 8 illustrates a flow of a charging control method according to the present embodiment.

FIG. 8 illustrates a flow S100 of a charging control method according to the present embodiment. This flow is for controlling charge of the battery 32 by the power generation apparatus 40a, and is performed at certain time intervals by the control section 91.

In step S102, the control section 91 calculates a charge loss characteristic of the battery 32. First, the control section 91 decides an internal resistance of the battery 32 based on the state of charge of the battery 32. Herein, the ECU 33 detects the state of charge of the battery 32, in particular, a charge amount and a temperature of the battery 32. The control section 91 applies those detection results to the relationship illustrated in FIG. 4 between the charge amount (SOC) and the temperature of the battery 32 and the internal resistance of the battery 32 to decide the internal resistance of the battery 32.

Subsequently, the control section 91 decides the charge loss characteristic of the battery 32 based on the internal resistance of the battery 32. Herein, the charge loss characteristic of the battery 32 refers to the relationship of the charge loss with respect to the input power input to the battery 32 which is illustrated in FIG. 3. It is assumed that the current (I) flowing into the battery 32 is proportional to the input power. The inter-terminal voltage (V) of the battery 32 may be defined by a rated voltage, for example. The control section 91 calculates the charge loss ($RI^2$) with respect to the input power (VI) by using the previously decided internal resistance (R). Thus, the charge loss characteristic is acquired.

In this manner, since the internal resistance of the battery 32 depends on the charge amount and the temperature of the battery 32, by detecting the charge amount and the temperature of the battery 32 to decide the internal resistance of the battery 32 based on the detection results, the charge loss characteristic of the battery 32 which is illustrated in FIG. 3 can be accurately decided.

In step S104, the control section 91 calculates an estimated flight period during which the aircraft 100 is in a predetermined flight state as a period for charging the battery 32. Herein, the predetermined flight state is set as the cruise state which is suitable for charging the battery 32 as described above. The flight period in the cruise state is long, and the power feed amount required to maintain the thrust to fly is low. A thrust fluctuation, that is, a power consumption fluctuation is also low. The battery 32 can be therefore stably charged with the application of the power generation control method according to the present embodiment. Thus, it is also possible to suppress the deterioration of the battery 32.

Note that the predetermined flight state is not limited to the cruise state, and may be set as any state in which the battery 32 can be charged within a range of the power amount that can be generated by the power generation apparatus 40a as long as an amount of power to be fed to the rotors 20 and 29 to maintain the state and a period during which the state continues are found.

During flight of the aircraft 100, the control section 91 calculates or updates the estimated flight period based on external information acquired from the outside and/or a state of the aircraft. The external information includes weather information such as a temperature, an air pressure, a weather, and a wind speed which are acquired from an airport or the like set as a destination. The state of the aircraft 100 includes weather information including a temperature, an air pressure, a weather, a wind speed, and the like on a flight path which are detected by various types of sensors included in the aircraft 100, and information related to a state of the aircraft such as a speed of the aircraft 100. As a result, since the estimated flight period is calculated or updated based on the external information and/or the state of the aircraft 100 which are acquired in real-time during flight, the fuel consumption can be highly accurately calculated.

Note that in the present embodiment, the estimated flight period until the aircraft 100 is to arrive at the destination is calculated or updated in real-time, but the configuration is not limited to this. The estimated flight period may be previously calculated based on a flight plan, or after the aircraft 100 enters the cruise state, the flight period may be calculated in real-time to update the previously calculated estimated flight period.

In step S106, the control section 91 detects the state of charge of the battery 32, and decides the power amount to be stored in the battery 32, that is, the target power charge amount based on the detection result. Herein, the ECU 33 detects the state of charge of the battery 32, in particular, the charge amount of the battery 32. The control section 91 decides, based on the detection result, the target power charge amount from the power amount required to charge the battery 32 to be fully charged (or the battery 32 may also be charged to an optionally defined charge amount), for example.

In step S108, the control section 91 decides a charging period characteristic indicating a charging period required for power output of the power generation apparatus 40a. Herein, by applying the target power charge amount decided in step S106 to the charge loss characteristic of the battery 32 which is calculated in step S102, the charging period characteristic can be derived. For example, the charge loss is subtracted from the power output of the power generation apparatus 40a, and the target power charge amount is divided using this, so that the charging period characteristic is acquired.

Figure 9:
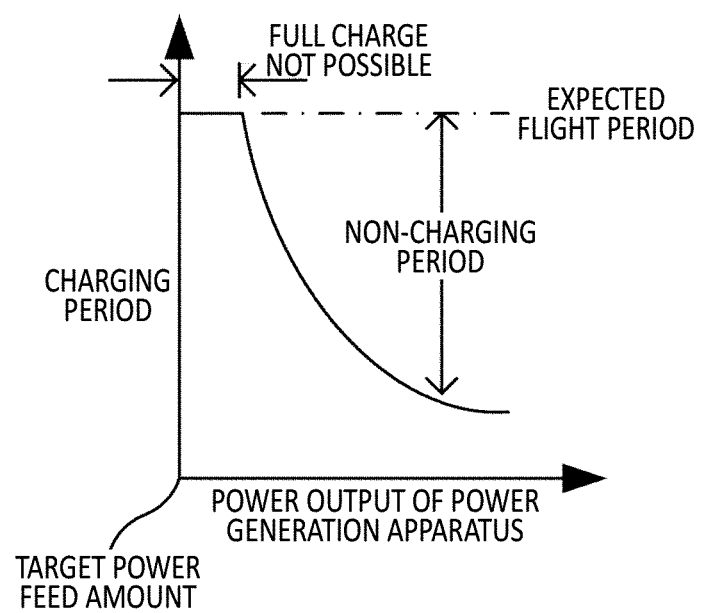
FIG. 9 illustrates a relationship (charging period characteristic) of a charging period of the battery with respect to power output of the power generation apparatus.

FIG. 9 illustrates an example of the charging period characteristic. Since the power output of the power generation apparatus 40a exceeds the amount of power to be fed to the load (that is, the target power feed amount), an excessive power generation amount thereof can be supplied to charge the battery 32. Herein, the target power feed amount is decided by the flight controller 92 based on, when the aircraft 100 is in a predetermined flight state (the present embodiment, the cruise state), the power amount to be supplied to the load (in particular, the cruising rotors 29) to maintain the state.

A period of time available to be spent for charging the battery 32 (which is referred to as a chargeable period) is given by the estimated flight period calculated in step S104 during which the aircraft 100 is in the predetermined flight state (that is, the cruise state). When the power output of the power generation apparatus 40*a* is small, since the charging speed is slow, it is not possible to charge the battery 32 with electric power of the target power charge amount (to be fully charged in the present embodiment) within the estimated flight period. When the power output of the power generation apparatus 40*a* has sufficiently increased, it becomes possible to charge the battery 32 within the estimated flight period, and as the power output is larger, the charging speed becomes faster, and the charging period becomes shorter. However, due to the charge loss characteristic of the battery 32, as the input power is larger, the charge loss further increases, and therefore the charging period presents a tendency to converge into a certain time period.

In step S110, the control section 91 calculates the fuel consumption of the power generation apparatus 40*a*. First, the control section 91 decides a charging period and a non-charging period based on the chargeable period and the charging period characteristic calculated in step S108. The non-charging period is acquired by subtracting the charging period from the chargeable period. Subsequently, the control section 91 applies the charging period characteristic to the fuel consumption characteristic to decide the fuel consumption during a charging moment for the power output of the power generation apparatus 40*a* (from a product of the charging period of the battery 32, the power output of the power generation apparatus 40*a*, and the specific fuel consumption). Note that the fuel consumption characteristic is acquired in advance for the power generation apparatus 40*a*.

Figure 10:
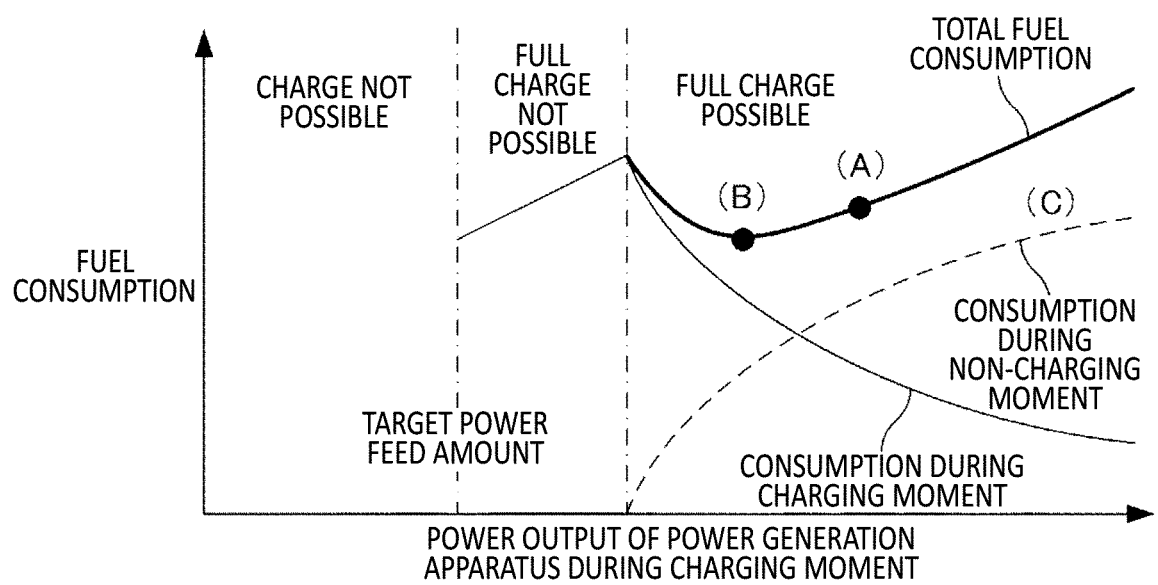
FIG. 10 illustrates a relationship between the power generation amount by the power generation apparatus and the fuel consumption.
Figure 11:
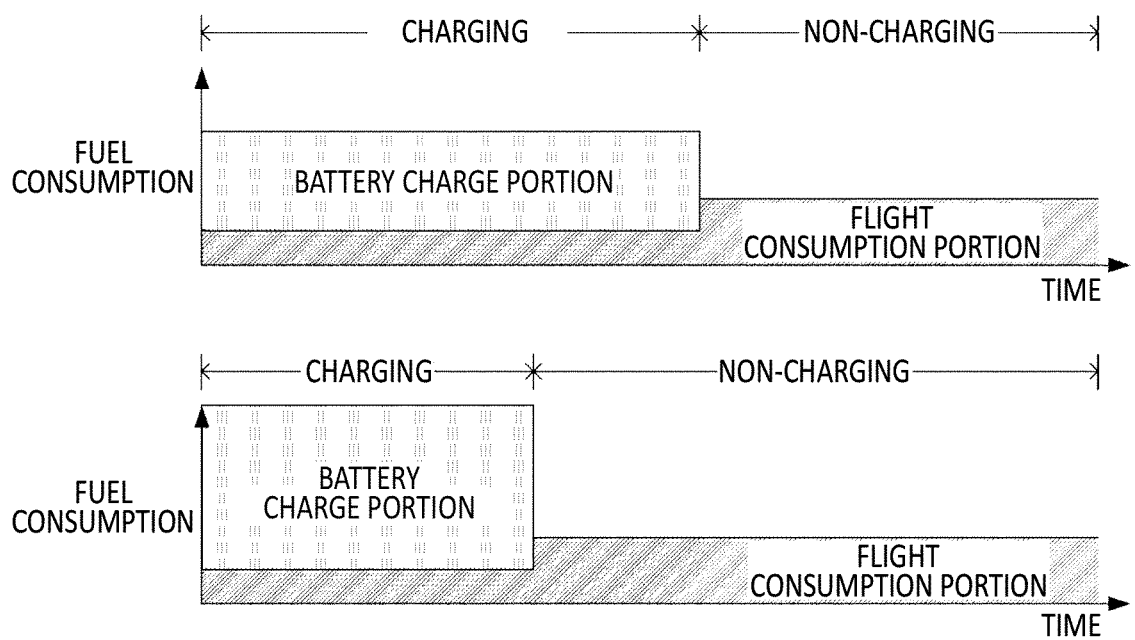
FIG. 11 illustrates an example of a power feed balance from the power generation apparatus to a load and the battery during flight.

FIG. 10 and FIG. 11 respectively illustrate a relationship (fuel consumption characteristic) between the power output and the fuel consumption of the power generation apparatus 40*a* during a battery charging moment and an example of a power feed balance from the power generation apparatus 40*a* to the rotors 20 and 29 and the battery 32 during flight. When the power output of the power generation apparatus 40*a* is lower than the target power feed amount to be fed to the rotors 20 and 29, it is not possible to charge the battery 32, and also it is not possible for the aircraft 100 to maintain the flight state. Therefore, the fuel consumption in this power output range is not examined.

Since the power output of the power generation apparatus 40*a* exceeds the target power feed amount, an excessive power generation amount thereof can be supplied to charge the battery 32. However, since the charging speed is slow, it is not possible to charge the battery 32 to be fully charged within a limited chargeable period (that is, the estimated flight period). Within this power output range in which the full charge is not possible, the fuel consumption by the power generation apparatus 40*a* increases in proportion to the power output.

When the power output of the power generation apparatus 40*a* exceeds the range in which the full charge is not possible, the battery 32 can be charged to be fully charged within the chargeable period (that is, the estimated flight period). At this time, as illustrated in FIG. 11, the estimated flight period includes a charging moment in which power is fed to the rotors 20 and 29 and also power is fed to the battery 32 to be charged and a non-charging moment in which power is fed to only the rotors 20 and 29 and power is not fed to the battery 32.

Herein, during a non-charging moment, since the power output from the power generation apparatus 40*a* is only the electric power to be fed to the rotors 20 and 29 to maintain the flight state, the fuel consumption includes only the flight consumption portion (equal to a product of the non-charging period, the electric power to maintain the flight state, and the specific fuel consumption) which is consumed to generate the electric power to be fed to the rotors 20 and 29. However, since the power generation amount is small, the specific fuel consumption is not satisfactory ((C) in FIG. 5), and the flight consumption portion is large to some extent. In addition to the above, even when the input power (power output of the power generation apparatus 40*a*) is increased, the charging period converges into a certain period of time as the charge loss increases, and the non-charging period also converges. Thus, the fuel consumption during a non-charging moment increases by gradually moderating a gradient with respect to the increase in the power output of the power generation apparatus 40*a* during a charging moment as illustrated in FIG. 10.

On the other hand, during a charging moment, since the power output from the power generation apparatus 40*a* includes the amount of power to be fed to the rotors 20 and 29 to maintain the flight state and the amount of power to be fed to the battery 32 to be charged, the fuel consumption includes the flight consumption portion and a battery charge portion consumed to generate electric power with which the battery 32 is to be charged. At this time, the power generation amount is larger than that during a non-charging moment and the specific fuel consumption is satisfactory ((A) and (B) in FIG. 5), and the flight consumption portion is smaller than that during a non-charging moment. When the power output from the power generation apparatus 40*a* increases, the specific fuel consumption improves, and the charging speed increases and the charging period shortens as illustrated in a top part of FIG. 11 (this state corresponds (B) in FIG. 5), and as a result, the fuel consumption during a charging moment decreases. However, when the power output from the power generation apparatus 40*a* further increases, the specific fuel consumption improves, and the charging speed increases and the charging period also shortens as illustrated in a bottom part of FIG. 11 (this state corresponds to (A) in FIG. 5), but on the other hand, the charge loss of the battery also abruptly increases. Thus, the fuel consumption during a charging moment decreases by gradually moderating a gradient with respect to the increase in the power output of the power generation apparatus 40*a* as illustrated in FIG. 10.

The total fuel consumption of the power generation apparatus 40*a* is calculated from a sum of the fuel consumption during a charging moment and the fuel consumption during a non-charging moment which are calculated as described above. As illustrated in FIG. 10, as the output power from the power generation apparatus 40*a* increases, the fuel consumption during a charging moment decreases. However, the decrease is moderated in accordance with the increase of the charge loss, and also the fuel consumption during a non-charging moment increases. Therefore, the total fuel consumption decreases along with the increase in the output power to become a local minimum at (B), and then switches to increase. At (A) where the power output from the power generation apparatus 40a is large, the total fuel consumption rather increases.

In step S112, the control section 91 controls charge of the battery 32 based on the fuel consumption. That is, the control section 91 decides the charging period of the battery 32 and the output power of the power generation apparatus 40a during a battery charging moment such that the fuel consumption of the power generation apparatus 40a decreases, and transmits the target power generation amount to ECUs 41 and 44 to control power generation by the power generation apparatus 40a. From (B) where the fuel consumption becomes the local minimum in FIG. 10, the optimal charging period of the battery 32 and the optimal output power of the power generation apparatus 40a can be decided.

With the completion of step S112, the flow S100 is ended.

The charging control system 70 according to the present embodiment includes the power unit having the power generation apparatus 40a configured to perform power generation to supply electric power to a load, and the battery 32 configured to accumulate the electric power supplied from the power generation apparatus 40a and supply the electric power that is accumulated to the load, and the control section 91 configured to apply a target power feed amount indicating an amount of power to be supplied to the load and a target power charge amount indicating an amount of power to be stored in the battery 32 to a charge loss characteristic of the battery 32 and a fuel consumption characteristic of the power generation apparatus 40a to decide a fuel consumption of the power generation apparatus 40a and to control charge of the battery 32 based on the fuel consumption. In accordance with this, by applying the target power feed amount indicating the amount of power to be supplied to the load and the target power charge amount indicating the amount of power to be stored in the battery 32 to the charge loss characteristic of the battery 32 and the fuel consumption characteristic of the power generation apparatus 40a, the charge loss of the battery 32 is reduced, and also the power generation apparatus 40a is operated at the satisfactory specific fuel consumption, so that the fuel consumption can be suppressed. In addition, since the battery 32 can be charged at the optimal charging speed, the deterioration of the battery 32 can also be suppressed.

The aircraft 100 according to the present embodiment includes the charging control system 70, and the load is the propulsion system including the rotors 20 and 29 configured to generate a thrust to fly. In this manner, the battery 32 can be efficiently charged during flight of the aircraft 100 to suppress the fuel consumption.

The charging control method according to the present embodiment includes applying, by the power unit having the power generation apparatus 40a configured to perform power generation to supply electric power to a load and the battery 32 configured to accumulate the electric power supplied from the power generation apparatus 40a and supply the electric power that is accumulated to the load, a target power feed amount indicating an amount of power to be supplied to the load and a target power charge amount indicating an amount of power to be stored in the battery 32 to a charge loss characteristic of the battery 32 and a fuel consumption characteristic of the power generation apparatus 40a to decide a fuel consumption of the power generation apparatus, and controlling charge of the battery based on the fuel consumption. In accordance with this, by applying the target power feed amount indicating the amount of power to be supplied to the load and the target power charge amount indicating the amount of power to be stored in the battery 32 to the charge loss characteristic of the battery 32 and the fuel consumption characteristic of the power generation apparatus 40a, the charge loss of the battery 32 is reduced, and also the power generation apparatus 40a is operated at the satisfactory specific fuel consumption, so that the fuel consumption can be suppressed. In addition, since the battery 32 can be charged at the optimal charging speed, the deterioration of the battery 32 can also be suppressed.

While the present invention has been described with the embodiments above, the technical scope of the present invention is not limited to the above described embodiments. It is apparent to persons skilled in the art that various alterations and improvements can be added to the above described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

What is claimed is:

1. A charging control system for controlling charge of a battery by a power generation apparatus, the charging control system comprising:
   at least one processor;
   a power unit having a power generation apparatus configured to, using the at least one processor, perform power generation to supply electric power to a load, and a battery configured to accumulate the electric power supplied from the power generation apparatus and supply the electric power that is accumulated to the load; and
   a control section configured to, using the at least one processor:
      apply a target power feed amount indicating an amount of power to be supplied to the load and a target power charge amount indicating an amount of power to be stored in the battery to a charge loss characteristic of the battery, which indicates a relationship of a charge loss of the battery with respect to an input power that is input to the battery, and a fuel consumption characteristic of the power generation apparatus, which indicates a relationship between a power generation amount and a specific fuel consumption of the power generation apparatus;
      decide a non-charging-period fuel consumption of the power generation apparatus during a non-charging period in which the battery is not charged and a charging-period fuel consumption of the power generation apparatus during a charging period in which the battery is charged; and
      control charge of the battery based on a total fuel consumption of the power generation apparatus obtained as a sum of the non-charging-period fuel consumption and the charging-period fuel consumption.

2. The charging control system according to claim 1, wherein the control section is further configured to, using the at least one processor, decide the charging period of the battery and output power of the power generation apparatus during the charging period of the battery to reduce the total fuel consumption of the power generation apparatus.

3. The charging control system according to claim 2, wherein the control section is further configured to, using the at least one processor, apply the target power charge amount to the charge loss characteristic of the battery to decide a charging period characteristic indicating a charging period required for power output of the power generation apparatus, and to apply the charging period characteristic to the fuel consumption characteristic to decide the charging-period fuel consumption during the charging period for the power output of the power generation apparatus.

4. The charging control system according to claim 1, wherein the control section is further configured to, using the at least one processor, detect a state of charge of the battery to decide the target power charge amount based on a result of a detection.

5. The charging control system according to claim 1, wherein the control section is further configured to, using the at least one processor, decide the charge loss characteristic of the battery based on an internal resistance of the battery.

6. The charging control system according to claim 5, wherein the control section is further configured to, using the at least one processor, detect at least one of a charge amount or a temperature of the battery to decide the internal resistance of the battery based on a result of a detection.

7. An aircraft comprising the charging control system according to claim 1, wherein
the load is a propulsion system configured to generate a thrust to fly.

8. The aircraft according to claim 7, further comprising a decision unit configured to, using the at least one processor, decide, when the aircraft is in a predetermined flight state, the target power feed amount to maintain the predetermined flight state based on the amount of power to be supplied to the load.

9. The aircraft according to claim 8, wherein the control section is further configured to, using the at least one processor, calculate a flight period during which the aircraft is in the predetermined flight state, and to decide a charging period of the battery further based on the flight period.

10. The aircraft according to claim 9, wherein the control section is further configured to, using the at least one processor, update the flight period based on at least one of external information acquired by the aircraft during flight from an outside or a state of the aircraft.

11. The aircraft according to claim 9, wherein the predetermined flight state is a cruise state.

12. The aircraft according to claim 8, wherein the predetermined flight state is a cruise state.

13. A charging control system for controlling charge of a battery by a power generation apparatus, the charging control system comprising:
at least one processor;
a power unit having a power generation apparatus configured to, using the at least one processor, perform power generation to supply electric power to a load, and a battery configured to accumulate the electric power supplied from the power generation apparatus and supply the electric power that is accumulated to the load; and
a control section configured to, using the at least one processor, apply a target power feed amount indicating an amount of power to be supplied to the load and a target power charge amount indicating an amount of power to be stored in the battery to a charge loss characteristic of the battery and a fuel consumption characteristic of the power generation apparatus to decide a fuel consumption of the power generation apparatus and to control charge of the battery based on the fuel consumption, wherein
the control section is further configured to, using the at least one processor, apply the target power charge amount to the charge loss characteristic of the battery to decide a charging period characteristic indicating a charging period required for power output of the power generation apparatus, and to apply the charging period characteristic to the fuel consumption characteristic to decide a fuel consumption during a charging moment for the power output of the power generation apparatus.

14. The charging control system according to claim 13, wherein the control section is further configured to, using the at least one processor, apply the target power feed amount to the fuel consumption characteristic to decide a fuel consumption during a non-charging moment for the power output of the power generation apparatus.

15. The charging control system according to claim 14, wherein the control section is further configured to, using the at least one processor, decide a chargeable period available to be spent for charging the battery, and to decide a charging period and a non-charging period based on the chargeable period and the charging period characteristic.

16. The charging control system according to claim 13, wherein the control section is further configured to, using the at least one processor, decide a chargeable period available to be spent for charging the battery, and to decide a charging period and a non-charging period based on the chargeable period and the charging period characteristic.

17. The charging control system according to claim 13, wherein the control section is further configured to, using the at least one processor, detect a state of charge of the battery to decide the target power charge amount based on a result of a detection.

18. The charging control system according to claim 13, wherein the control section is further configured to, using the at least one processor, decide the charge loss characteristic of the battery based on an internal resistance of the battery.

19. An aircraft comprising the charging control system according to claim 3, wherein
the load is a propulsion system configured to generate a thrust to fly.

20. A charging control method for controlling charge of a battery by a power generation apparatus, the charging control method comprising:
applying, by a power unit having a power generation apparatus configured to perform power generation to supply electric power to a load and a battery configured to accumulate the electric power supplied from the power generation apparatus and supply the electric power that is accumulated to the load, a target power feed amount indicating an amount of power to be supplied to the load and a target power charge amount indicating an amount of power to be stored in the battery to a charge loss characteristic of the battery, which indicates a relationship of a charge loss of the battery with respect to an input power that is input to the battery, and a fuel consumption characteristic of the power generation apparatus, which indicates a relationship between a power generation amount and a specific fuel consumption of the power generation apparatus;
deciding a non-charging-period fuel consumption of the power generation apparatus during a non-charging period in which the battery is not charged and a charging-period fuel consumption of the power generation apparatus during a charging period in which the battery is charged; and controlling charge of the battery based on a total fuel consumption of the power generation apparatus obtained as a sum of the non-charging-period fuel consumption and the charging-period fuel consumption.

\* \* \* \* \*